(12) United States Patent
Southern

(10) Patent No.: US 7,171,781 B1
(45) Date of Patent: Feb. 6, 2007

(54) PLANT POT CODING

(75) Inventor: Donald Southern, Eden, NC (US)

(73) Assignee: Amerikan, LLC, Sarasota, FL (US)

( * ) Notice: Subject to any disclaimer, the term of this patent is extended or adjusted under 35 U.S.C. 154(b) by 430 days.

(21) Appl. No.: 10/353,882

(22) Filed: Jan. 29, 2003

(51) Int. Cl.
*A01G 9/02* (2006.01)
*B65D 21/02* (2006.01)

(52) U.S. Cl. .................... 47/66.1; 206/423; 47/65.5; 47/72; 47/66.7; 220/23.87

(58) Field of Classification Search .................. 47/75, 47/65.5, 65, 65.7, 66.1, 73, 86, 72, 79, 87, 47/84; 206/423; 220/23.89, 23.87, 737; *A01G 9/02, A01G 27/02*
See application file for complete search history.

(56) References Cited

U.S. PATENT DOCUMENTS

| | | | | |
|---|---|---|---|---|
| 1,679,621 A | * | 8/1928 | Myers | 220/592.16 |
| 3,288,340 A | * | 11/1966 | Shapiro et al. | 206/519 |
| 3,973,316 A | * | 8/1976 | Maher | 29/416 |
| 4,715,144 A | * | 12/1987 | Lee | 47/66 |
| 5,205,432 A | * | 4/1993 | Gullan | 220/592.14 |
| 5,704,109 A | * | 1/1998 | Weder | 29/469.5 |
| 5,761,848 A | * | 6/1998 | Manlove | 47/66 |
| 5,879,071 A | * | 3/1999 | Sanford | 362/154 |
| 5,953,859 A | * | 9/1999 | Cochran et al. | 47/66.5 |
| 6,161,332 A | * | 12/2000 | Avot | 47/81 |
| 6,526,693 B2 | * | 3/2003 | Cochran | 47/66.5 |
| 2002/0184821 A1 | * | 12/2002 | Campeau | 47/72 |
| 2003/0033752 A1 | * | 2/2003 | Van Laere | 47/79 |

FOREIGN PATENT DOCUMENTS

| | | | |
|---|---|---|---|
| DE | 4401753 | * | 6/1994 |
| DE | 29609260 | * | 5/1996 |
| GB | 2265292 | * | 9/1993 |
| JP | 2002218846 | * | 8/2002 |
| SU | 1804287 A | * | 9/1990 |
| WO | WO 87/02327 | * | 4/1987 |

OTHER PUBLICATIONS

Nursery Supplies Full Product Line Catalog, Summer 2002, Pot-in-Pot System, 3 pages.*
KOBA Corporation Catalog, Plastic Cover Pots, 3 pages.*

* cited by examiner

Primary Examiner—Andrea M. Valenti
(74) Attorney, Agent, or Firm—MacCord Mason PLLC

(57) ABSTRACT

A plant pot system includes an inner pot and an outer coded container pot. The inner plant pot includes a lip lock ridge and belt. The outer coded container pot includes a lip lock band and groove; and has one of a range of appearances. The inner plant pot containing a plant is placed within the outer pot and locks into place by engagement of the ridge in the groove so the combined pots have the appearance of the selected outer pot.

18 Claims, 5 Drawing Sheets

PLANT POT CODING

BACKGROUND OF THE INVENTION

The present invention relates to a plant potting system for flowers or other plants. The plant potting system includes an inner plant pot to be filled with a growing medium and plants or flowers and an outer container pot, which holds the inner plant pot firmly in place. Nursery owners who sell their flowers to large retail outlets, such as Wal-Mart or K-Mart, tend to grow their plants or flowers in an inexpensive, blow-molded black plastic pot. The large retailers require a visible coding for display and pricing purposes. In the past, an attempt was made to place UPC or other stickers on the containers, in order to assist in the pricing or presentation of the plants or flowers by the large retailers. However, sometimes consumers would remove the stickers before they reached the checkout counter and cause confusion with respect to the pricing of the item. As a consequence while nursery owners have continued to grow the plants or flowers in the cheaper black containers, they added a colored outer pot indicative of the pricing or presentation code of the retailer and stapled the two pots together or fastened them in some other way. Without affixing the inner pot to the outer pot, confusion was caused by consumers removing one inner pot and putting it in another outer pot. These fastening methods have not resulted in a successful solution.

There is a need for nursery owners selling to retailers to be able to utilize the less expensive, black, blow-molded plastic containers to grow the plants or flowers in and to have an outer container which satisfies the code requirement of the retailer. It is desirable to use the two pot arrangement, with the black inner pot being placed within the coded container and locked in place without the need for stapling or some other method of fastening the inner container to the outer container.

SUMMARY OF THE INVENTION

The present invention addresses one or more needs in the art by providing a plant pot system which has an inner plant pot for containing a growing medium and a plant or flower and an outer coded container pot.

The inner plant pot maybe constructed of a blow-molded plastic and includes a lip lock ridge and a lip lock belt. The inner plant pot may include vertically aligned inward deflections for reinforcement purposes. The inner plant pot typically has a drain hole in the bottom of the pot. The outer coded container pot is typically also constructed of blow-molded plastic and is coded by color or pattern on the exterior surface on the container pot as specified by the retailer. Typically the coded pot is molded in a specific color of plastic to provide the identification. The outer coded container includes a lip lock band and a lip lock groove, and may have vertically aligned inward reflections and a drainage hole in the bottom.

The inner plant pot containing the flower or plant is placed within the outer coded container pot. The inner plant pot snap locks into place within the outer coded container pot. This snap lock process is accomplished by the complementary mating of the lip lock ridge of the inner plant pot with the lip lock groove of the outer coded container pot. In addition, the snap lock preferably includes the frictional engagement of the lip lock belt of the inner plant pot with the inside face of the sidewall of the outer coded container pot. A circumferential corrugation provides stiffness to the top of the wall of the inner pot and helps keep it engaged against the inside of the outer pot. The weight and volume of the growing medium in the inner plant pot may provide additional pressure to ensure that the snap lock process is completed, and difficult or impossible to reverse.

The plant pot system also provides for a method of selling potted plants. This method includes obtaining a supply of inner plant pots and a supply of outer coded container pots. Utilizing the inner plant pots, nursery personnel place the growing medium in the inner pots, along with seedlings or seeds. The plants in the inner plant pot are grown to the size suitable for sale. Orders are received from purchasers, such as retailers, which include a color or pattern code selected by the customer. Outer coded container pots with the selected code are identified, and the inner plant pots containing the plants or flowers are snap locked into place within the outer coded container pot. The plants or flowers are then ready for delivery to the customer.

These and other aspects of the present invention will become apparent to those skilled in the art after reading the following description of the preferred embodiments when considered with the drawings.

BRIEF DESCRIPTION OF THE DRAWINGS

The invention will be better understood by a reading of the Detailed Description of Examples of the Invention along with a review of the drawings, in which.

DETAILED DESCRIPTION OF EXAMPLES OF THE INVENTION

Figure 1:
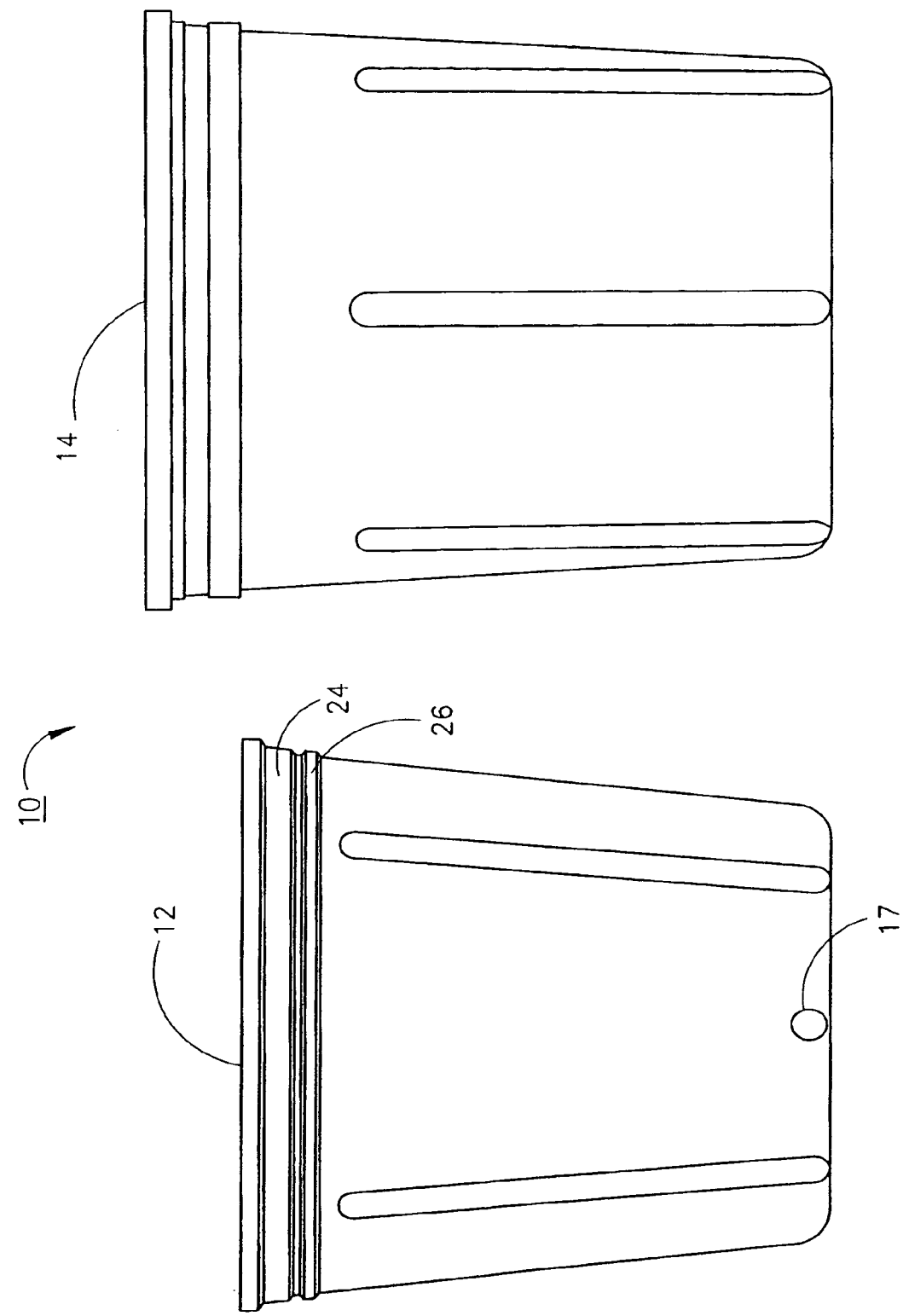
FIG. 1 is a side view of the inner plant pot and the outer coded container pot according to a preferred embodiment of the invention.

In the following description, like reference characters designate like or corresponding parts throughout the several views. Also in the following description it is to be understood that such terms as "forward", "rearward", "left", "right", "upwardly", "downwardly", and the like are the words of convenience and are not to be construed as limiting terms. It will be understood that the illustrations are for the purpose of describing a preferred embodiment of the invention and are not intended to limit the invention thereto.

As best seen in FIG. 1, the plant potting system 10 is shown with the inner plant pot 12 and the outer, coded container pot 14.

Figure 2:
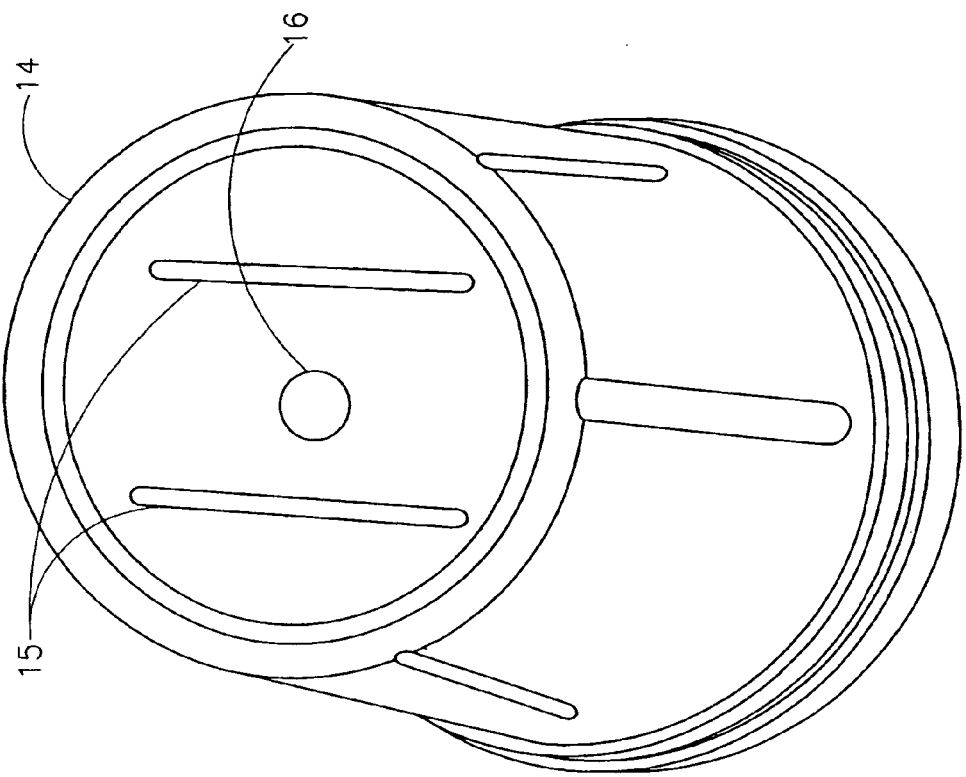
FIG. 2 is a bottom perspective view of the inner plant pot and the outer coded container according to the embodiment of FIG. 1.
Figure 2:
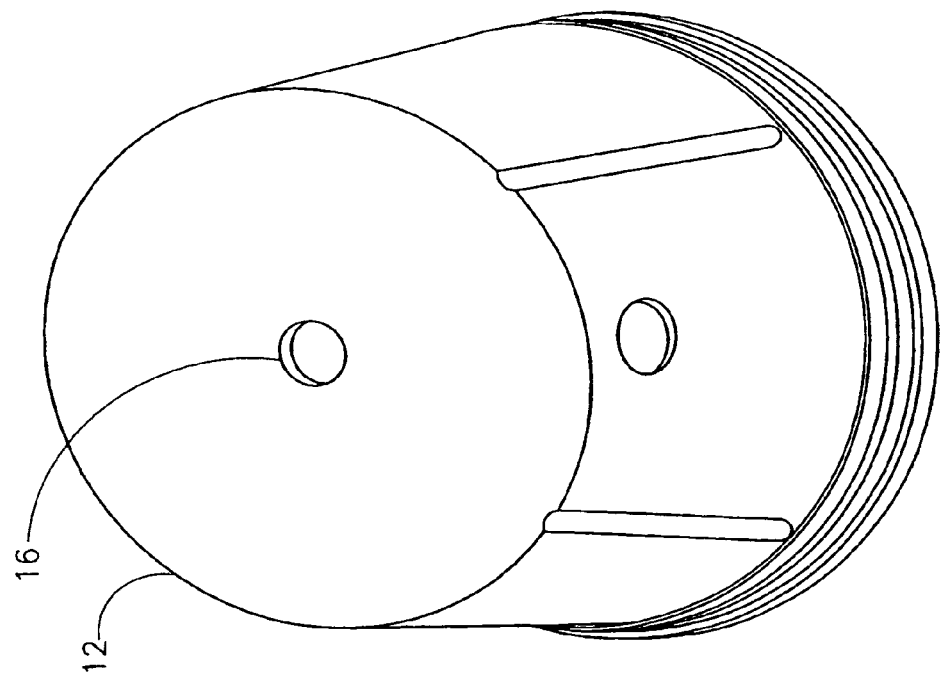
Figure 3:
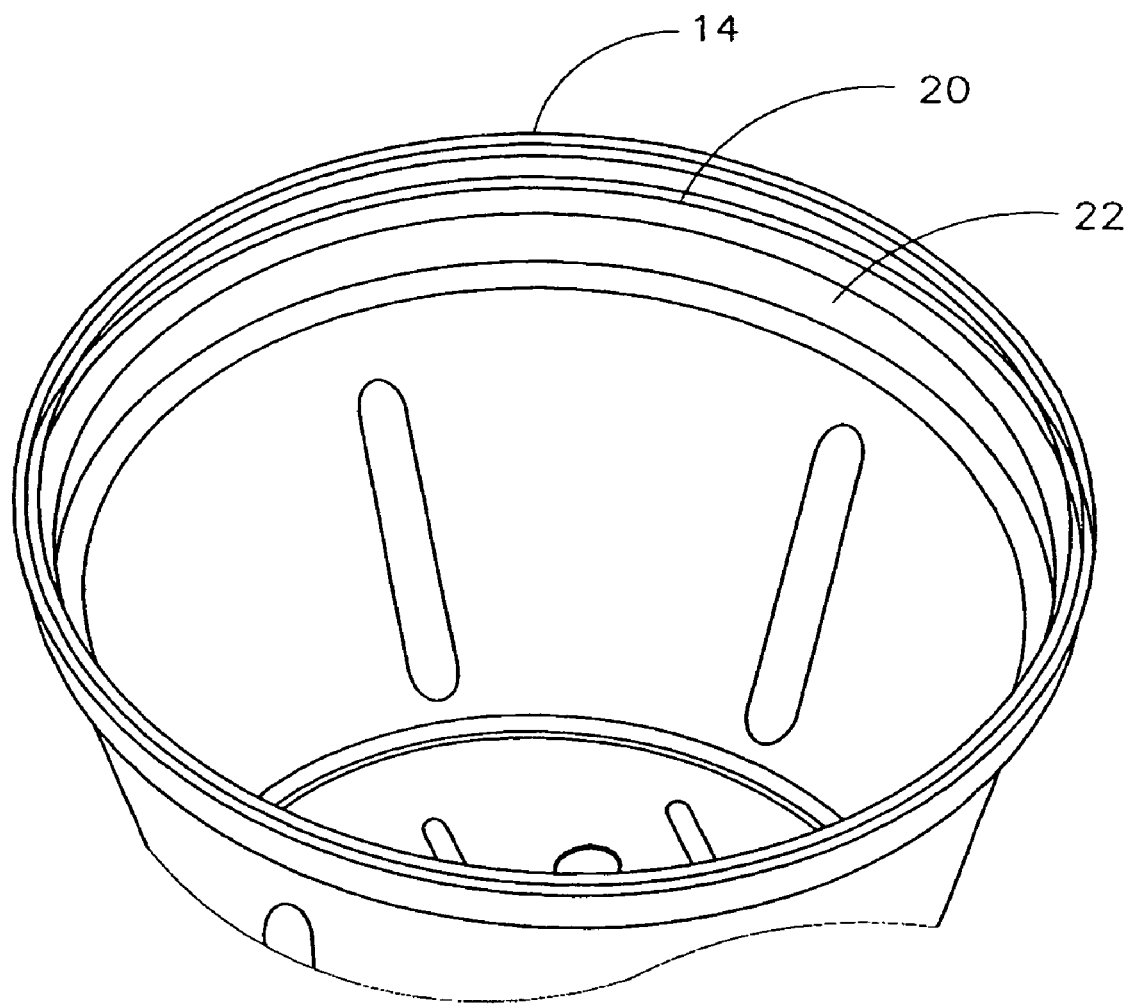
FIG. 3 is a top perspective view of the outer coded container pot depicting the band and groove.
Figure 4:
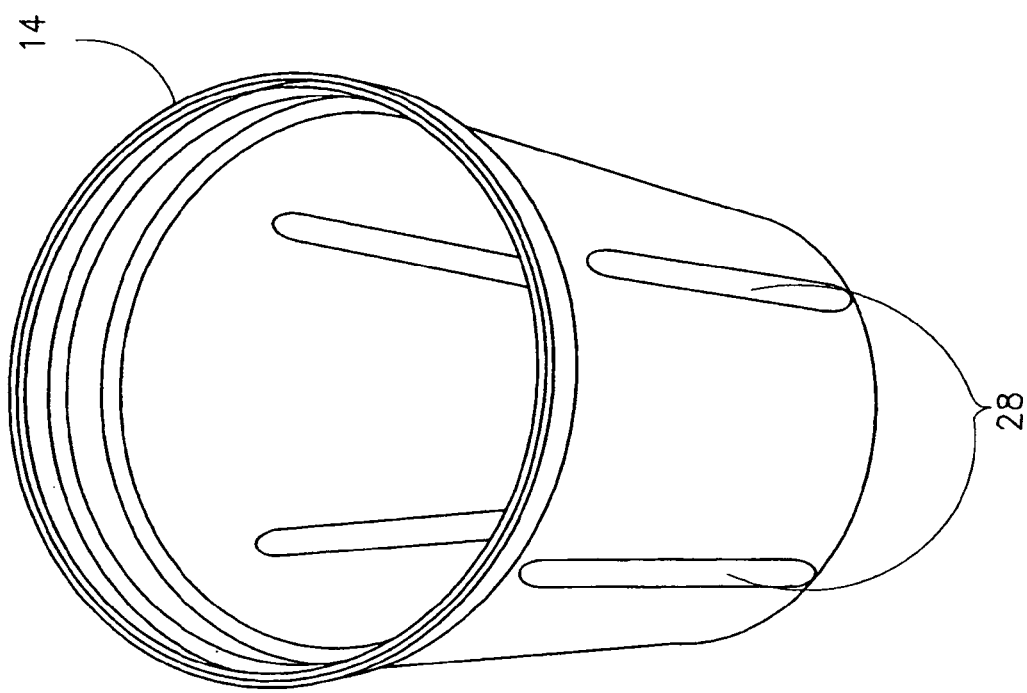
FIG. 4 is a top perspective view of the inner plant pot and the outer coded container pot depicting the vertical recesses and ridges.
Figure 4:
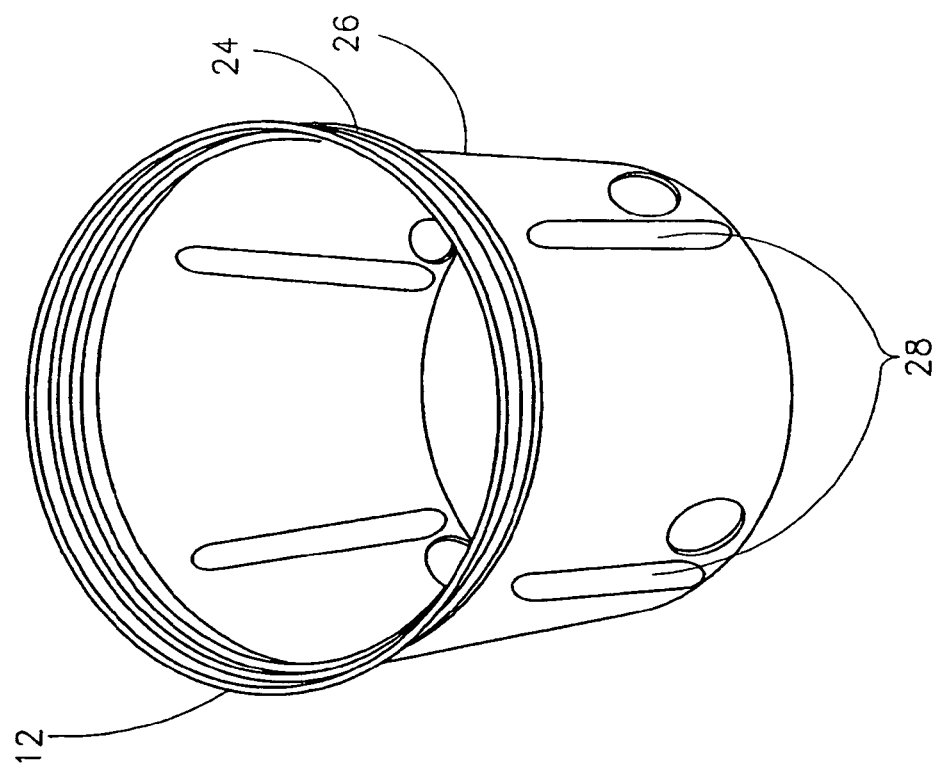

FIGS. 1, 2 and 4 depict the inner plant pot 12, which is typically constructed of blow molded plastic. The inner plant pot 12 contains a bottom drainage hole 16, a sidewall drainage hole 17, a lip lock ridge 24 facing outwardly, and a lip lock belt 26 facing outwardly having an circumferential corrugation 23 (see FIG. 5). The inner plant pot 12 further includes vertically aligned inward deflections 28 forming conventional reinforcing corrugations in the sides.

The outer pot 14 is shown in FIGS. 1, 2, 3 and 4. The outer coded container pot 14 includes a drainage hole 16, a lip lock band 20 protruding inwardly and a lip lock groove 22 facing inwardly. The pot 14 also has vertically aligned inward deflections 28, for reinforcement. These vertical recesses and ridges 28 also provide spacing when the pot 12 is located within the outer pot 14. As seen in FIG. 2, the outer pot has spacing ridges 15 formed as raised lines in the bottom of the outer pot. These ridges provide spacing of the inner pot above the bottom of the outer pot so drainage can occur from the side holes 17 of the inner pot.

The inner plant pot 12 is used to grow the plant from a cutting, seedling or seeds. The plant is fed and watered until it reaches the size for sale. The term "plants" as used in this application refers to all types of plants, including but not limited to flowering plants, foliage plants, vegetable plants, and trees including fruit trees.

When an order is received, the grower determines the appropriate code required by the buyer for the outer coded container pot 14. The code may be a color code or a pattern code. The code specified for the outer container pot 14 may be used for plant pricing, plant sizing, decorative or any other purpose chosen by the grower. The inner plant pot 12 is placed within the selected, outer coded container pot 14. The vertical recesses and ridges 28 of the inner plant pot 12 and the outer coded container pot 14 permit spacing of the inner plant pot 12 within the outer coded container pot 14 and reinforce the outer wall. They also provide space for drainage, such as drainage from sidewall holes 17 of the inner pot 12.

Figure 5:
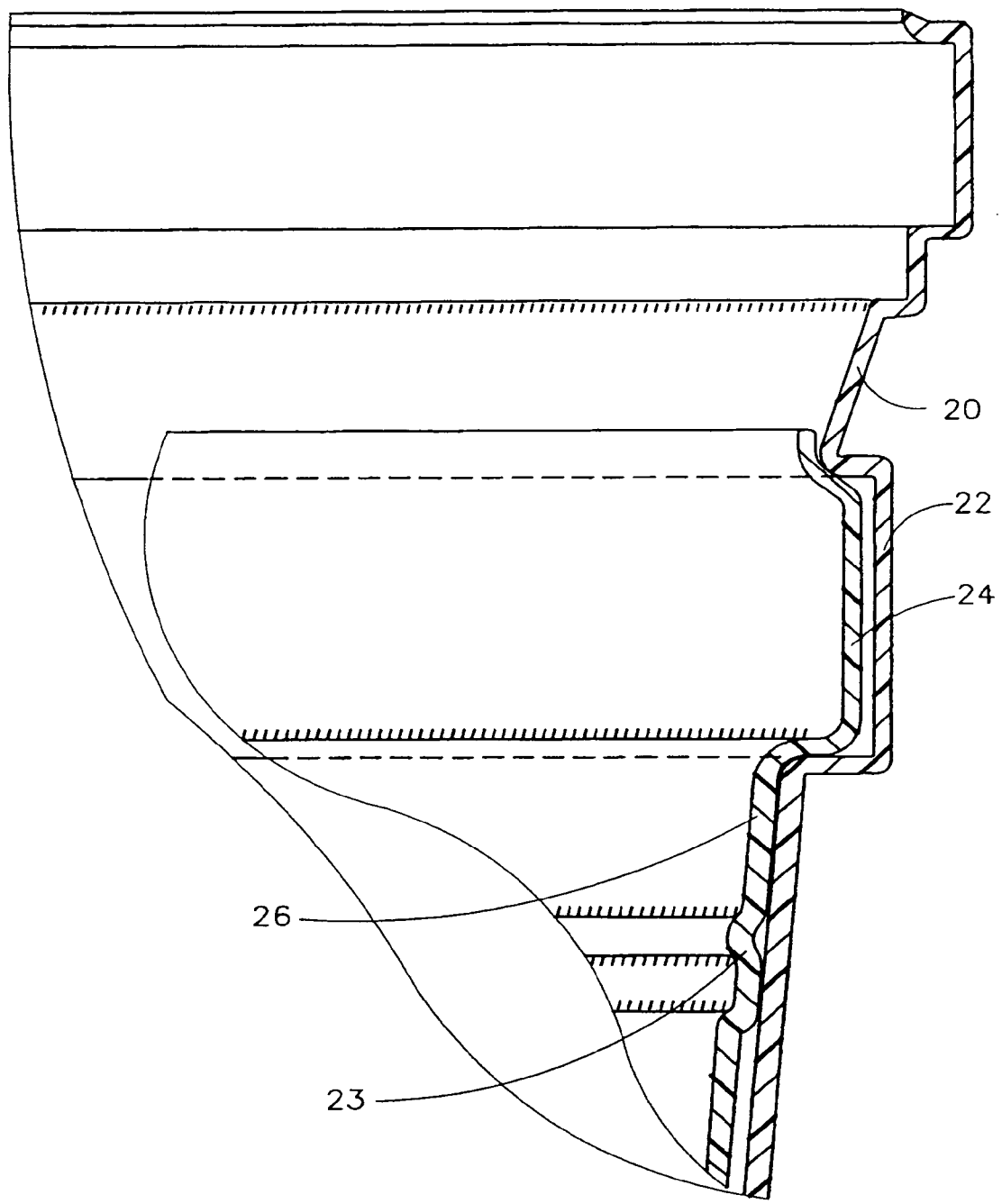
FIG. 5 is a sectional view of the tops of the sidewalls of nested inner and outer pots, partially broken away.

The inner plant pot 12 snaps into the outer coded container pot 14 and locks to prevent removal. As seen in FIG. 5, the snap lock is accomplished as the ridge 24 passes below the band 20 so as to enable the complementary mating of the lip lock ridge 24 of the inner plant pot 12 with the lip lock groove 22 of the outer container pot 14. The snap lock is further accomplished by the frictional engagement of the lip lock belt 26 of the inner plant pot 12 with the inside face of the outer coded container pot. The circumferential corrugation 23 help to maintain roundness and oppose radially inward collapsing of the inner pot wall. The weight and volume of the growing medium within the inner plant pot 12 provides additional pressure to ensure that the complementary mating of the recess and ridges of the inner plant pot 12 and the outer coded container pot 14 snap properly into place and form the lip lock which keeps the inner plant pot 12 in place. Once the inner pot snaps in place, the inner plant pot 12 is virtually not removable from the outer coded container pot 14. Removal would require flexing the inner pot inwardly, which is restrained by corrugation 23 and by the growing medium. The plant is ready for sale and shipment. The shipper can maintain inventory of a variety of differently-appearing outer pots and use an outer pot having a selected appearance from the inventory to meet a customer's ordering preference.

Certain modifications and improvements will occur to those skilled in the art upon reading the foregoing description. For example, the pots can be made in other ways, such as rotomolding, injection molding or thermoforming. In addition, the outer pot can be applied for other purposes, such as structural reinforcement, or pure decoration. Other ways to lock the pots together can also be considered such as engaging tabs and slots, engaging bumps and recesses, and the like.

It should be understood that all such modifications and improvements have been omitted for the sake of conciseness and readability, but are properly within the scope of the following claims.

What is claimed is:

1. A plant pot system comprising:
    a substantially rigid, self-supporting inner plant pot containing a growing medium and a plant or flower and having a top and outwardly protruding lip lock ridge below the top;
    an outer coded container having a top and a continuous sidewall with an inside and an outwardly protruding portion forming a lip lock groove on the inside of the outwardly protruding portion of the sidewall; and
    the inner pot and outer container configured to securely engage with one another by the complementary mating of the lip lock ridge of the inner pot within the lip lock groove of the outer coded container when said inner pot is placed within the outer container,
    wherein once the pot and container are engaged, the top of the outer container extends above the top of the inner pot.

2. The apparatus according to claim 1, wherein said inner plant pot is constructed of a blow molded plastic.

3. The apparatus according to claim 1, wherein said inner plant pot further includes a lip lock belt located below the lip lock ridge and sized to engage the inside of the sidewall of the outer container.

4. The apparatus according to claim 1, wherein said inner plant pot further includes vertically aligned recesses.

5. The apparatus according to claim 1, wherein said inner plant pot further includes a drain hole in the bottom of said inner plant pot.

6. The apparatus according to claim 1, wherein said outer container is constructed of blow molded plastic.

7. The apparatus according to claim 1, wherein said outer container has an exterior surface and is coded by a color or pattern on the exterior surface.

8. The apparatus according to claim 7, wherein said coded color or pattern is specified by the purchaser.

9. The apparatus according to claim 1, wherein said outer container further includes a lip lock band positioned above the lip lock groove and having an inside diameter less than an outside diameter of the lip lock ridge so that the lip lock band engages the inner pot and thereby restrains withdrawal of the inner pot from the outer container.

10. The apparatus according to claim 1, wherein said outer container includes vertically aligned inward deflections.

11. The apparatus according to claim 1, wherein said outer container includes a drainage hole in the bottom of said outer container.

12. The apparatus according to claim 1, wherein said inner plant pot is snap locked into the outer container.

13. The apparatus according to claim 12, wherein said snap lock is accomplished by the complementary mating of the lip lock ridge of said inner plant pot with the lip lock groove of said outer container.

14. The apparatus according to claim 12, wherein said snap lock further includes the frictional engagement of a lip lock belt of said inner plant pot with the inside of the sidewall of said outer container.

15. The apparatus according to claim 13, wherein said snap lock is assisted by the pressure of the weight of the growing medium in said inner plant pot.

16. A plant pot system comprising
    an inner plant pot constructed of plastic and having a bottom and a substantially rigid sidewall including an outwardly protruding circumferential lip lock ridge, a lip lock belt below the lip lock ridge, vertically aligned recesses below the lip lock belt, and a drain hole in the bottom; and an outer container constructed of plastic and having a bottom with a drain hole and a substantially rigid sidewall that includes an inner face having an inwardly protruding lip lock band, a lip lock groove below the lip lock band, and vertically aligned inward deflections below the lip lock band;

wherein said inner plant pot can be snap locked into the outer container and retained in the outer container by the complementary mating of the lip lock ridge of said inner plant pot with the lip lock groove of said outer container, and the frictional engagement of the lip lock belt of said inner plant pot with the inner face of the sidewall of the outer container.

17. A method of selling potted plants comprising:

growing a plant in growing medium in an inner pot that has an outwardly protruding lip lock ridge;

receiving an order from a customer to purchase the plant;

inserting the inner pot containing the growing medium and plant into an outer container having a color or pattern code appearance specified by the customer and engaging the lip lock ridge in a lip lock groove in an inside face of a continuous sidewall of the outer container so that the inner pot cannot be removed from the outer container without removal of the growing medium from the inner pot; and shipping the potted plant to the customer.

18. A plant pot system comprising an inner plant pot containing a growing medium and a plant and having a continuous sidewall having an integrally formed protruding lip lock ridge and a lip lock belt, and and outer container having a continuous substantially vertical sidewall formed with a lip lock groove and an inside face, the inner pot and outer container being configured to securely engage with one another by engagement of the lip lock ridge in the lip lock groove and engagement of the lip lock belt on the inside face of the outer container when the inner pot is placed in the outer container.

* * * * *